Feb. 19, 1946.  R. K. MORSE  2,395,343
WELDING ROD HOLDER
Filed Aug. 3, 1944
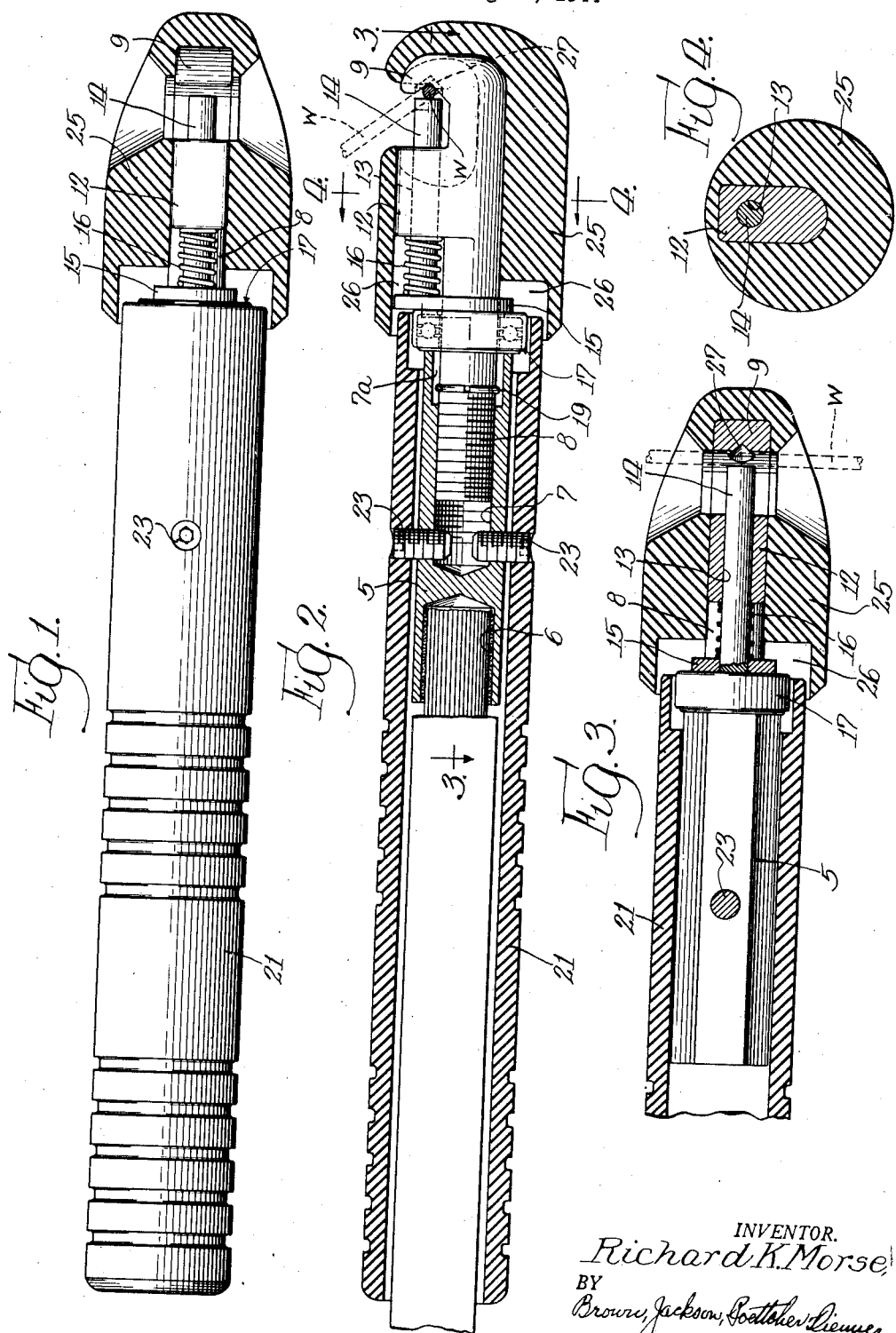
INVENTOR.
Richard K. Morse
BY
Brown, Jackson, Boettcher Dienner
Atty's.

Patented Feb. 19, 1946

2,395,343

UNITED STATES PATENT OFFICE 2,395,343

WELDING ROD HOLDER

Richard K. Morse, Muskegon, Mich., assignor to The Kaydon Engineering Corporation, Muskegon, Mich., a corporation of Michigan Application August 3, 1944, Serial No. 547,874

8 Claims. (Cl. 219—8)

My invention relates to welding equipment and particularly to an electrode holder, and its object is to provide an improved clamping head or "stinger."

My invention is illustrated in the accompanying drawing in which—

Figure 1 is a plan view of the holder, partly in horizontal section;

Figure 2 is an elevational view, largely in vertical section;

Figure 3 is a partial horizontal view, mainly in section, taken on the planes of the line 3—3 of Figure 2, looking downwardly, as indicated by the arrows; and Figure 4 is a cross sectional view taken on the plane of the line 4—4 of Figure 2 and looking in the direction indicated by the arrows.

The heart of the device as a whole is in the form of a socket member 5, for instance of brass or bronze, of substantial and uniform polygonal cross-section throughout its length. At its rear end this member 5 is provided with a socket 6 for receiving the stripped stranded end of an insulated electrical cable conductor, the socket being preferably tinned for the reception of anchoring solder, thus holding the end of the cable firmly in the socket with good electrical contact.

The forward end of the socket member 5 is provided with a bore 7 which is threaded for the reception of a threaded stem 8 of the removable clamping head or "stinger" of my invention. The bore 7 is enlarged at its forward end, as indicated at 7a, for a purpose which will presently appear. The stem 8 extends forwardly and, at its end, is formed into a hook-shaped clamping member 9. In line with the hook-shaped clamping member, the stem 8 is provided with the guide lug 12, drilled at 13, parallel to the axis of the stem, for the reception of the sliding clamping pin 14, the forward end of which, as will be seen, cooperates with the hook-shaped clamping member 9.

At its rearward end, and thus rearwardly of the guide lug 12 and spaced therefrom, the clamping pin 14 has secured thereto the follower plate 15 which embraces the stem 8; in other words, the follower plate 15 has an opening therein whereby it may be slipped over the stem 8 to ride upon it. A helical spring 16 is disposed about the clamping pin 14, between the guide lug 12 and follower plate 15, this spring tending to move the clamping pin 14 rearwardly in the bore 13.

Between the follower plate 15 and the forward end of the socket member 5, a conventional thrust ball bearing unit 17, surrounding the stem 8, is disposed. To the immediate rear of the ball bearing unit, the stem 8 is provided with an annular groove in which a snap ring 19 is disposed, to act as a keeper for the ball bearing unit in the clamping head or "stinger" subassembly. This snap ring is located in the enlarged bore 7a.

It will be observed that, as the socket member 5 is turned on its own axis in the proper direction, with the clamping head held against rotation, the stem 8 is drawn into the bore 7, and the ball bearing unit effects minimum friction, notwithstanding the considerable pressure exerted against the follower plate 15.

A tubular handle 21, of hard rubber or other insulating material, surrounds the socket member 5, fixed in the handle by means of set screws 23, 23. This handle is of such length and is so formed as to embrace the ball bearing unit.

A hood 25, also of hard rubber or other insulating material, fits snugly over the protruding end of the stem 8 and its described appurtenances, however leaving the inside of the hook-shaped clamping member 9 and the free end of the clamping pin 14 exposed. The hood 25 is also so formed as to overlap the end of the handle 21, as shown, its interior being formed, as at 26, to provide for the movement of the follower plate within it.

It will now be clear that, by turning the handle 21 relative to the clamping head, the end of the clamping pin 14 and the inside of the hook-shaped clamping member 9 can be brought forcibly together, so that a welding rod w can be clamped between them, as indicated in full lines in Figure 2 and dotted lines in Figure 3; and the welding rod, when initially and loosely inserted between the end of the clamping pin 14 and the inside of the hook-shaped clamping member, can act to hold the clamping head, as a whole, against rotation while the handle is being turned.

The inside of the hook-shaped member is provided with a notch 27 to enable close approach of the end of the clamping pin 14, or to hold the welding rod in the position shown in dotted lines in Figure 2 if desired.

The foregoing description and the accompanying drawing are of a clamping head or stinger which I have developed and which I set forth here as an example. It will be understood that changes and modifications can be made without departing from the spirit and scope of my invention.

I claim:

1. In a welding rod holder, a member to which an electrical conductor is to be attached and having a threaded bore in from one end, a stem threaded in said bore and carrying a clamping hook and a cooperating sliding clamping pin eccentric to said stem, and a follower on said clamping pin slidable on said stem and presenting a face for cooperation with said first-named member, whereby, when said stem is drawn into said first named member, said clamping hook will be drawn toward said clamping pin.

2. In a welding rod holder, a member to which an electrical conductor is to be attached and having a threaded bore in from one end, a stem threaded in said bore and carrying a clamping hook and a cooperating clamping pin eccentric to said stem, a follower on said clamping pin slidable on said stem and presenting a face for cooperation with said first named member, and an antifriction thrust unit disposed between said follower and said first named member, whereby, when said stem is drawn into said first named member, said clamping hook will be drawn toward said clamping pin.

3. In a welding rod holder, a member to which an electrical conductor is to be attached and having a threaded bore in from one end, a stem threaded in said bore and carrying a clamping hook and means for guiding a clamping pin, a clamping pin sliding in said last named means and placed in position for cooperation with said hook, and a follower on said clamping pin and riding on said stem and presenting a face for cooperation with said first named member, whereby, when said stem is drawn into said first named member, said clamping hook will be drawn toward said clamping pin.

4. In a welding rod holder, a member to which an electrical conductor is to be attached and having a threaded bore in from one end, a stem threaded in said bore and carrying a clamping hook and means for guiding a clamping pin, a clamping pin sliding in said last named means and placed in position for cooperation with said hook, a follower on said clamping pin and riding on said stem and presenting a face for cooperation with said first named member, and a ball bearing unit disposed about said stem between said follower plate and said first named member, whereby, when said stem is drawn into said first named member, said clamping hook will be drawn toward said clamping pin.

5. In a welding rod holder, a member to which an electrical conductor is to be attached and having a threaded bore in from one end, a stem threaded in said bore and carrying a clamping hook and a cooperating sliding clamping pin eccentric to said stem, a follower on said clamping pin guided by said stem and presenting a face for cooperation with said first-named member, whereby, when said stem is drawn into said first named member, said clamping hook will be drawn toward said clamping pin, a tubular handle of insulating material surrounding said first-named member, and a hood of insulating material surrounding the free end of said stem, but exposing the inside of said clamping hook and the end of said clamping pin, and overlapping said handle.

6. A clamping head for a welding rod holder comprising a stem, threaded at one end and formed to a hook at the other end, said stem having a guiding lug, a clamping pin sliding in said lug and cooperating with said hook, and a follower secured to said pin and riding on said stem.

7. A clamping head for a welding rod holder comprising a stem, threaded at one end and formed to a hook at the other end, said stem having a guiding lug, a clamping pin sliding in said lug and cooperating with said hook, a follower secured to said pin and riding on said stem, and a spring between said follower and said guiding lug.

8. A clamping head for a welding rod holder comprising a stem, threaded at one end and formed to a hook at the other end, said stem having a guiding lug, a clamping pin sliding in said lug and cooperating with said hook, a follower secured to said pin and riding on said stem, a spring between said follower and said guiding lug, and a ball bearing unit mounted on said stem adjacent said follower.

RICHARD K. MORSE.